(12) United States Patent
Akutagawa et al.

(10) Patent No.: US 7,364,196 B2
(45) Date of Patent: Apr. 29, 2008

(54) VEHICLE CONTROL METHOD AND VEHICLE CONTROL APPARATUS

(75) Inventors: Keizo Akutagawa, Tokyo (JP); Hiroki Sawada, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 0 days.

(21) Appl. No.: 10/069,588

(22) PCT Filed: Jun. 27, 2001

(86) PCT No.: PCT/JP01/05486

§ 371 (c)(1),
(2), (4) Date: Feb. 27, 2002

(87) PCT Pub. No.: WO02/00463

PCT Pub. Date: Jan. 3, 2002

(65) Prior Publication Data
US 2002/0167156 A1 Nov. 14, 2002

(30) Foreign Application Priority Data
Jun. 28, 2000 (JP) .............................. 2000-195084

(51) Int. Cl.
*B62K 28/16* (2006.01)

(52) U.S. Cl. ........................ 280/757; 701/72; 701/82

(58) Field of Classification Search ................. 180/197, 180/65.8, 65.5, 65.1; 280/757; 701/82, 701/84, 90, 71, 72, 81
See application file for complete search history.

(56) References Cited

U.S. PATENT DOCUMENTS

| | | | |
|---|---|---|---|
| 5,258,912 A | 11/1993 | Ghoneim et al. | |
| 5,948,961 A * | 9/1999 | Asano et al. | 73/9 |
| 6,324,461 B1 * | 11/2001 | Yamaguchi et al. | 180/197 |

FOREIGN PATENT DOCUMENTS

| | | | |
|---|---|---|---|
| DE | 3610519 A1 * | 10/1987 | |
| EP | 0 747 691 A | 12/1996 | |
| GB | 2052655 A * | 1/1981 | |
| JP | 02109749 A * | 4/1990 | |
| JP | 07322417 A * | 12/1995 | |
| JP | 08334454 A * | 12/1996 | |
| JP | 09145552 A * | 6/1997 | |
| JP | 11263152 A * | 9/1999 | |

* cited by examiner

*Primary Examiner*—Eric Culbreth
(74) *Attorney, Agent, or Firm*—Sughrue Mion, PLLC (57) ABSTRACT

When feedback control is carried out to ensure that the drive torque of an electric motor for driving each wheel of a vehicle should be equal to a motor torque instruction value, micro-vibration is applied to each tire by superposing a micro-vibration signal to a drive signal for the above electric motor to change the slip ratio-friction characteristics themselves of the tire to control friction force between the tire and the surface of a road, thereby controlling the running performance of the vehicle.

14 Claims, 6 Drawing Sheets

VEHICLE CONTROL METHOD AND VEHICLE CONTROL APPARATUS

BACKGROUND OF THE INVENTION

1. Field of the Invention

The present invention relates to a method of controlling the running state of a vehicle by controlling friction force between the surface of a road and tires and to an apparatus for carrying out the method.

2. Description of the Prior Art

Means of controlling the running state of an automobile include a driver's empirical driving technique and an electronic control system such as ABS (Anti-Lock Brake System) for controlling the speed of each wheel and a slip ratio (10 to 30%) to obtain a high friction coefficient or traction control system for controlling a brake unit, engine speed or torque.

Figure 8:
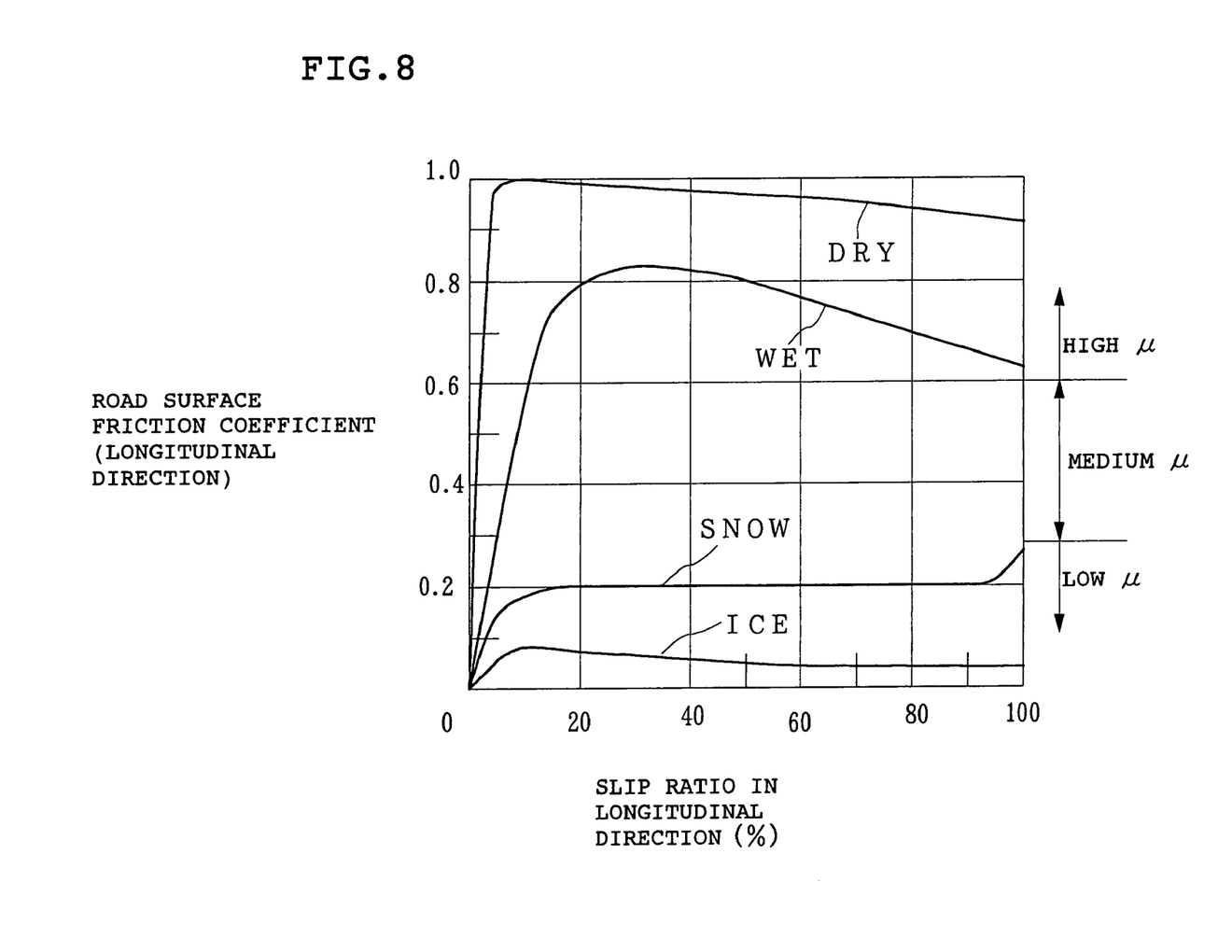
FIG. 8 is a diagram showing differences in the slip ratio-friction characteristic curve of each tire according to the condition of a road surface.

The above electronic control system controls to exhibit the friction force of each tire to the maximum in order to stabilize a vehicle. This system aims to ensure vehicle directionability, steerability and controllability so as to avoid a danger by controlling the locked state of wheels by increasing or decreasing the hydraulic pressure of a brake or the torque of a driving system to obtain a slip ratio that ensures fully great cornering force and great braking force. Therefore, the slip ratio-friction characteristic curve of the tire, as shown in FIG. 8, is estimated and the slip ratio is controlled based on this estimated curve to obtain the maximum friction coefficient in limits not to cause a side slip. In order to detect the running state of the vehicle, an acceleration sensor and a yaw rate sensor are mounted on the vehicle to control the slip ratio of the tire based on signals from these sensors to stabilize the vehicle.

However, the slip ratio-friction characteristic curve of the tire greatly differs according to the condition of a road surface such as dry, wet, snowed or iced surface as shown in FIG. 8. Therefore, the slip ratio-friction characteristic curve used for the above ABS control may differ from a slip ratio-friction characteristic curve under the condition of a road surface at the time of actual control and it is difficult to estimate the accurate speed of the vehicle at the time of cornering, thereby reducing the reliability of the slip ratio. As a result, satisfactory control may not be carried out.

Further, in the above electronic control system, since the above acceleration sensor and the yaw rate sensor are mounted on the vehicle having a lower response frequency than the response frequency of the tire, the feedback control of the electronic control system tends to delay in comparison with a sensing-feedback system around the tires. Since feedback control is carried out after the vehicle having a great inertia mass shows an unstable change, there is a tendency that the vehicle can be stabilized by controlling with a intense feedback signal.

It is an object of the present invention which has been made in view of the above problems of the prior art to improve the running performance of a vehicle and enhance the safety of the vehicle by changing the slip ratio-friction characteristics of each tire by detecting the unstable state of the tire.

SUMMARY OF THE INVENTION

The present invention makes it possible to control the slip state of each tire by using a method different from the conventional tire friction force control method. It is possible to control force generated in the tire independently of the circumferential speed and the gravity center speed of the tire generated by the steady revolution of the tire by applying micro-vibration to the tire revolving in a steady state. That is, by applying micro-vibration to the tire itself, force generated by the tire can be freely controlled while the slip ratio or slip angle of the tire is maintained at a fixed level, thereby making it possible to greatly improve controllability compared with the tire friction force control method of the prior art.

That is, according to a first aspect of the present invention, there is provided a vehicle control method comprising applying vibration to a tire to change friction force between the tire and the surface of a road so as to control the running state of a vehicle.

According to a second aspect of the present invention, there is provided a vehicle control method, wherein the above vibration is micro-vibration having a higher frequency than the response frequency of a vehicle.

Since the friction force of the tire can be thereby optimized before the vehicle becomes unstable, it is possible to control the running state of the vehicle without fail.

Further, since micro-vibration having a higher frequency than the response frequency of the vehicle is used, in the case of malfunctioning of a control system, the risk of speeding of the vehicle can be reduced compared with the conventional system which relies on strong feedback.

According to a third aspect of the present invention, there is provided a vehicle control method, wherein the above vibration is applied in at least one of the revolution direction, width direction and load support direction of the tire.

According to a fourth aspect of the present invention, there is provided a vehicle control method, wherein the amplitude of the above vibration is modulated to 1 to 2,000% of the depth of a tread or the thickness of a top tread of rubber of the tire.

According to a fifth aspect of the present invention, there is provided a vehicle control method, wherein the frequency of the above vibration is modulated to 1 Hz to 1 kHz.

According to a sixth aspect of the present invention, there is provided a vehicle control method, wherein the frequency of the above vibration is modulated to 20 Hz to 1 kHz.

According to a seventh aspect of the present invention, there is provided a vehicle control method, wherein at least one of the amplitude, frequency and phase of deformation of vibration to be applied to the tire in the load support direction or revolution direction of the tire is controlled to minimize the rolling resistance of the tire caused by friction between the tire and the surface of a road at the time of running.

According to an eighth aspect of the present invention, there is provided a vehicle control apparatus which comprises vibration generating means for generating vibration to be applied to each tire and control means for controlling at least one of the amplitude, frequency and phase of deformation of vibration generated by said vibration generating means, and controls the frequency and phase of deformation of vibration to be generated by the vibration generating means and which controls friction force between the tire and the surface of a road by applying vibration optimized for the deformation characteristics and responsibility of the tire to the tire so as to control the running state of the vehicle.

According to a ninth aspect of the present invention, there is provided a vehicle control apparatus, wherein the vibration is micro-vibration having a higher frequency than the response frequency of a vehicle.

According to a tenth aspect of the present invention, there is provided a vehicle control apparatus, wherein the above control means is provided with means of turning on or off the above vibration generating means to control the above friction force as required.

Other objects and advantages of the present invention will become apparent from the following description when taken in conjunction with the accompanying drawings.

DESCRIPTION OF THE PREFERRED EMBODIMENT

A preferred embodiment of the present invention will be described hereinbelow with reference to the accompanying drawings.

Figure 1:
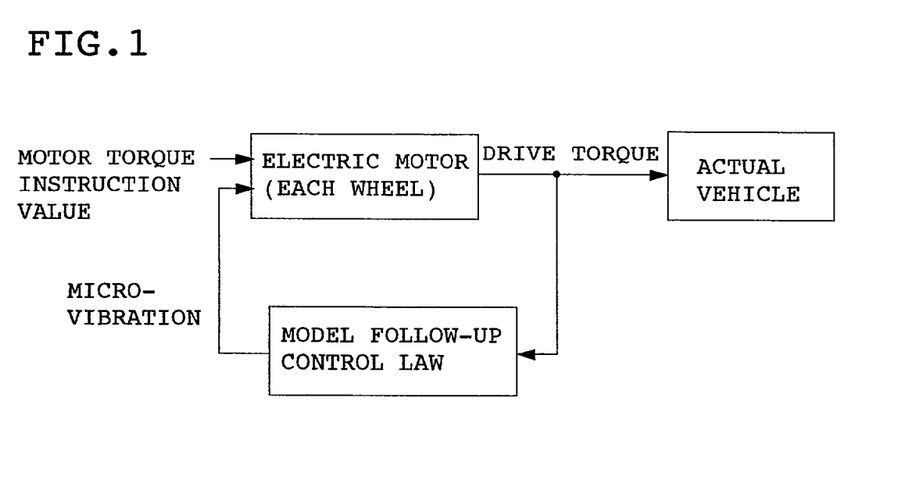
FIG. 1 is a control block diagram of a vehicle control apparatus according to a preferred embodiment of the present invention.

FIG. 1 is a control block diagram of a vehicle control apparatus according to the preferred embodiment of the present invention. The vehicle control apparatus which controls the running state of a vehicle running by driving wheels by means of electric motors will be described hereinbelow.

The electric motors for driving the wheels of the vehicle are driven and controlled according to a motor torque instruction value (drive signal) for obtaining required drive torque. In regular control, the drive torque of each wheel or the above electric motor is detected and feedback control is carried out so that the above detected drive torque should become the above motor torque instruction value.

In this preferred embodiment of the present invention, in addition to the above regular control, a micro-vibration signal is superposed on the drive signal of the above electric motor to apply micro-vibration to each tire to control the friction force of the tire. The amplitude, frequency and phase of the above micro-vibration are controlled according to the size of the detected drive torque of the wheel or electric motor.

Model follow-up control is used as the control law of the above micro-vibration.

Stated more specifically, the characteristics of a vehicle are considered as inertia moment in a vehicle/tire/road surface system and the above control law is established, paying attention to the fact that when a slip occurs, the value of inertia moment detected by an inertia moment observer for the revolution direction of the tire becomes small. That is, a vehicle model which does not slip (the inertia moment of a revolving system for the vehicle is large) is used as a normative model, correction torque which is a difference between the above drive torque and normative drive torque corresponding to the inertia moment of the above normative model is calculated, and dynamic micro-vibration having correction torque or an amplitude of a voltage value, revolution speed and current value corresponding to the correction torque at a higher frequency than the response frequency of a change in the behavior of the vehicle is applied to the above electric motor to modulate the amplitude in order to subtract this correction torque or a voltage value, revolution speed and current value corresponding to the correction torque from the above motor torque instruction value of the tire which actually slips or a voltage value, revolution speed and current value corresponding to the correction torque so that control is carried out to annul the difference between the above inertia moment and the normative inertia moment.

In this case, without using an acceleration sensor or yaw rate sensor mounted on the vehicle as in the vehicle stabilization control system of the prior art, the unstable state of each tire is detected by using only a torque sensor and a wheel revolution speed sensor for detecting the revolution state of the tire to optimize the friction force of the tire with a micro-feedback vibration signal before the vehicle becomes unstable.

The relationship between micro-vibration applied to the tire and friction force between the tire and the road surface will be explained hereinbelow.

Generally speaking, force generated by the tire is determined by friction force between the tire and the road surface and the deformation of the tire, and the maximum friction force between the tire and the road surface is determined by the surface roughness of the road surface and the viscoelastic characteristics of the top tread of rubber of the tire. That is, force generated by the tire is determined by the size of deformation of the tire within the maximum friction force between the tire and the road surface.

Changes in the longitudinal-direction slip ratio in a longitudinal direction and in the transverse-direction slip angle in a transverse direction are determined by the size of deformation of the tire and force generated by the tire is also determined by these changes. Although the size of deformation of the actual tire may be in the range of several millimeters to several tens of millimeters when the maximum friction force between the tire and the road surface is applied, the present invention makes it possible to control force generated by the tire by a control method for controlling such small deformation by dynamic vibration, independently of the conventional drive/brake steering system.

Figure 2:
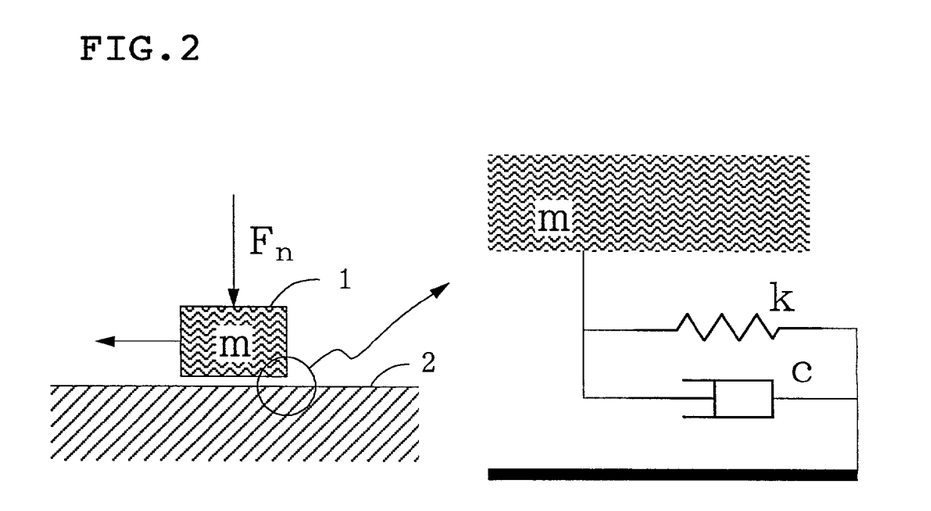
FIG. 2 is a diagram showing a friction model according to the preferred embodiment of the present invention.

The theoretical background of this principle can be also explained using a simple friction model shown in FIG. 2. In this friction model, a rubber block 1 (may include a base rubber, belt and ply in the case of a tire) is used to apply a load Fn to a road surface 2 and micro-vibration to the road surface 2 by sliding in a fixed direction. When friction force applied to the rubber block 1 sliding in the fixed direction is represented by $\mu \cdot Fn$ ($\mu$ is the friction coefficient of the road surface), the mass of the rubber block is represented by m, the spring constant between the rubber block 1 and the road surface 2 is represented by k, the attenuation coefficient is represented by c and the resonance frequency is represented by $\omega 0$, the following vibration equation is obtained.

[Equation 1]

$$m\frac{d'x}{dt'} = F_n - 2m\psi\omega_o\frac{dx}{dt} - m\omega_o x$$

By solving the above equation, the ratio μrel of friction force (μe·Fn) when micro-vibration is applied to friction force (μn·Fn) when micro-vibration is not applied is obtained.

[Equation 2]

$$\mu_{rel} = \frac{\mu_l}{\mu_n} = \left\{\left(\left[1 - \left(\frac{\omega}{\omega_o}\right)^2\right]\right)^2 + \left(\frac{2\psi\omega}{\omega_o}\right)^2\right\}^{1/2} \quad \text{[equation 2]}$$

$$(\omega_0 = \sqrt{k/m},\ \psi = c/2\sqrt{km})$$

It can be understood from this concept that force (friction force of the tire with the road surface) generated by the tire can be freely controlled by applying vibration in the direction of the force of the tire to be controlled. The ratio μrel of friction force depends on the frequency w of micro-vibration to be applied and tends to become smaller as w becomes closer to the above resonance frequency ω0.

Further, the above μrel value can be increased by providing a frequency higher than the above resonance frequency ω0 by frequency modulation.

As for the amplitude of micro-vibration to be applied in this model, it is supposed that micro-vibration corresponding to the amount of deformation of the rubber block 1 caused by sliding is applied. From this, it is preferred to apply micro-displacement corresponding to the deformation of the tire to the actual tire. While it has been difficult to control very small deformation of the tire when this micro-vibration is to be controlled by the conventional drive/brake/steering system, it is possible to control the above deformation by adding novel means of applying micro-dynamic vibration in the present invention.

Figure 3:
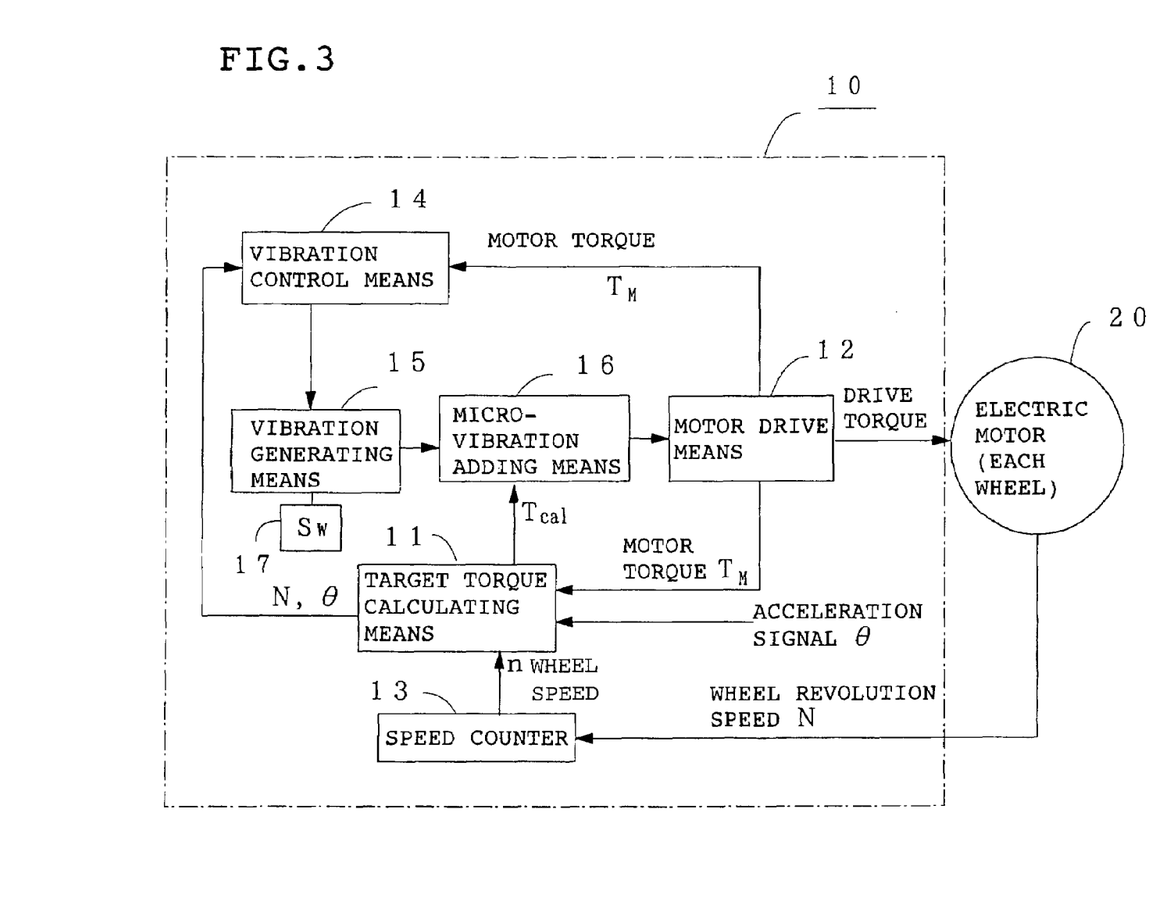
FIG. 3 is a diagram showing the constitution of the vehicle control apparatus according to the preferred embodiment of the present invention.

FIG. 3 is a diagram showing the constitution of a vehicle control apparatus 10 for controlling the friction force of a tire by applying micro-vibration in the revolution direction of the tire.

In the figure, reference numeral 11 denotes target torque calculating means for calculating a motor torque instruction value $T_{cal}$ from an acceleration signal θ, wheel speed n and motor torque $T_M$ detected by motor drive means 12 for driving an electric motor 20 for driving each wheel of a vehicle. The wheel speed is obtained by converting a wheel revolution speed N detected by an unshown revolution sensor by means of a speed counter 13 and applied to the above target torque computing means 11.

Reference numeral 14 denotes vibration control means for controlling vibration generating means 15 for generating a micro-vibration signal, which controls the amplitude, frequency and phase of the micro-vibration generated by the above vibration generating means 15 according to the above acceleration signal, wheel revolution speed and motor torque based on the above control law.

Denoted by 16 is micro-vibration adding means for adding a motor torque instruction value from the target torque computing means 11 and a micro-vibration signal from the vibration generating means 15 to compute target drive torque and applying the target drive torque to the motor drive means 12. The above target drive torque indicates a drive current for driving the electric motor 20 and the motor drive means 12 drives the above electric motor 20 with the target drive torque superposed by the above micro-vibration.

Numeral 17 represents a friction control switch for turning on or off the above vibration generating means 15. In this preferred embodiment of the present invention, the driver himself turns on or off the vibration generating means 15.

When control means such as the above target torque calculating means 11 and the vibration control means 14 are constituted with computer software, the above motor torque and acceleration signal are applied to the above means through an A/D converter and the above target drive torque signal is applied to the motor drive means 12 through a D/A converter.

A description is subsequently given of the operation of the above vehicle control apparatus 10.

When the vehicle runs on a dry asphalt road, the drive turns off the friction control switch 17 to carry out regular running control. That is, the above target torque calculating means 11 computes a motor torque instruction value from the detected motor torque of the motor drive means 12, acceleration signal and wheel speed to carry out the feedback control of the electric motor 20 so that the drive torque of the electric motor 20 should be equal to the above motor torque instruction value.

When the vehicle enters a low-μ road such as a wet asphalt road and the tires idle or slip, the driver turns on the friction control switch 17 to apply vibration to each tire and runs while controlling the friction force of the tire. When the friction control switch 17 is turned on, the vibration control means 14 determines the amplitude, frequency and phase of micro-vibration to be generated by the vibration generating means 15 according to motor torque detected by the motor drive means 12 and applies them to the vibration generating means 15. The vibration generating means 15 generates a micro-vibration signal based on a control instruction from the vibration control means 14. This micro-vibration signal is added to a motor torque instruction value from the target torque calculating means 11 by the micro-vibration adding means 16 and the obtained signal is supplied to the motor drive means 12 as new target drive torque. The motor drive means 12 drives the electric motor 20 based on the above new target drive torque.

Since friction force between the tire and the road surface can be thereby controlled while the slip ratio or slip angle of the tire is maintained at a fixed value on the low-μ road, the running performance of the vehicle can be improved and the safety of the vehicle can be enhanced.

As for the ON/OFF operation of the friction control switch 17, a road surface sensor for detecting the condition of a road surface, such as road surface friction coefficient estimation means, may be mounted on the vehicle so that the friction control switch 17 is automatically turned on based on information from the above road surface sensor when the road is a low-μ road and the tires idle or slip.

Alternatively, an inertia moment observer may be composed of revolution speed sensors for the wheels, current sensor for the electric motor and the like, and a filter such as a high pass filter may be incorporated in the apparatus to prevent it from responding to a slow 20 Hz or less change in inertia moment detected by the inertia moment observer so that control is made on only a drastic change which cannot be controlled by the driver.

Micro-deformation vibration to be applied to each tire is optimized for the deformation characteristics and responsibility of the tire and the accuracy and fineness of control are preferably set to match the structure of the vehicle and/or the tire. The amplitude and frequency range of micro-vibration to be applied must be set for the time constant of the tire or a section from the actuator to the tire and a phase delay as parameters.

Then the inventors of the present invention have found and determined a frequency range where the gain of a transmission function for input in the revolution direction of the tire is large and noise is small, using a tire vibration transmission function measuring instrument. As a result, it has been confirmed that sufficient vibration displacement cannot be obtained for input vibration at a frequency range of 1 kHz or more because the gain is small.

Meanwhile, although sufficient vibration displacement is obtained at a low frequency range because the gain is large, when large vibration displacement is applied if vibration displacement is small at the time of actual running, the friction force of the tire follows the vibration, whereby a smooth change in friction force cannot be obtained. Therefore, the frequency of micro-vibration is preferably 1 Hz or more, more preferably 20 Hz or more because the frequency is higher than the response frequency of a change in the behavior of the vehicle.

Further, as the responsibility of the tire is a function of the non-linear characteristics of deformation of the tire or the speed of the vehicle, a transmission function is calculated from the following tire dynamic property state equation and the frequency of micro-vibration is modulated as a function of the speed of the vehicle or the non-linear characteristics of the tire, thereby making it possible to improve a control effect.

Tire longitudinal-direction dynamic property state equation:

$$\ddot{F}_x = -\frac{k_x}{m}F_x - \frac{k_x}{m}\left(\frac{c_x}{h_x} + \frac{1}{2V}\right)\dot{F}_x + \frac{k_x}{m}\cdot\mu(\lambda)\cdot N \qquad \text{[equation 3]}$$

Tire transverse-direction dynamic property state equation:

$$\ddot{F}_y = -\frac{k_y}{m}F_y - \frac{k_y}{m}\left(\frac{c_y}{k_y} + \frac{1}{2V}\right)\dot{F}_y + \frac{k_y}{m}\cdot\mu\left(\alpha - \frac{21}{3V}\dot{\alpha}\right)\cdot N \qquad \text{[equation 4]}$$

In the above equations, $F_x$ is force in the longitudinal direction of the tire, $F_y$ is force in the transverse direction of the tire, $k_x$ is a spring constant in the longitudinal direction of the tire per unit area, $k_y$ is a spring constant in the transverse direction of the tire per unit area, $c_x$ is an attenuation coefficient in the longitudinal direction of the tire per unit area, $c_y$ is an attenuation coefficient in the transverse direction of the tire per unit area, m is the mass of a tire crown portion per unit area, l is the length of the tire in contact with the ground, V is the speed of the vehicle, N is a load to be applied to the tire, $\lambda$ is a slip ratio, $\alpha$ is the slip angle, and $\mu$ is the slip ratio of a slip ratio-friction curve or a slip angle-friction coefficient curve.

Since the response frequency of the tire is high when the speed of the vehicle is high, the frequency of micro-vibration can be made high, thereby making possible faster control. Since the means of modulating frequency is determined by the time constant of the vehicle tire system in this case, a frequency at which the gain of a transmission function and a phase delay become optimum is selected according to the speed of the vehicle and the deformation state of the tire. A composite wave comprising various frequency components is used to enable more highly accurate control.

The size of a change in the friction force of the tire is determined by the ratio X of vibration amplitude (mm) to the slip ratio (%) between the tire and the road surface. The change in the friction force of the tire becomes greater as the above X value increases. As a result of experiments, a tire friction force changing effect is obtained when X is in the range of 0.1 to 2.0. More specifically, it has been confirmed that when the slip ratio is 1%, the effect is obtained at a vibration amplitude of 0.1 to 2 mm and when the slip ratio is 100%, the effect is obtained at a vibration amplitude of 10 to 200 mm. The value is equivalent to an amplitude of 1 to 2000% when the thickness of the tread rubber is 10 mm. Since the size of the vibration amplitude is a function of the relative slip speed of the tire in contact with the ground and the friction coefficient of the road surface, it is preferred to control the amplitude of dislocation vibration in the actual test. However, in this embodiment, a change in the revolution speed of the tire which is changed by a vibration torque value or voltage value feedback by the model follow-up control law is used to carry out amplitude modulation control.

In the actual test, the upper limit of the above amplitude is determined by the limit torque performance and frequency of an actuator for applying vibration. In this embodiment, the electric motor 20 corresponds to the above actuator.

Figure 4:
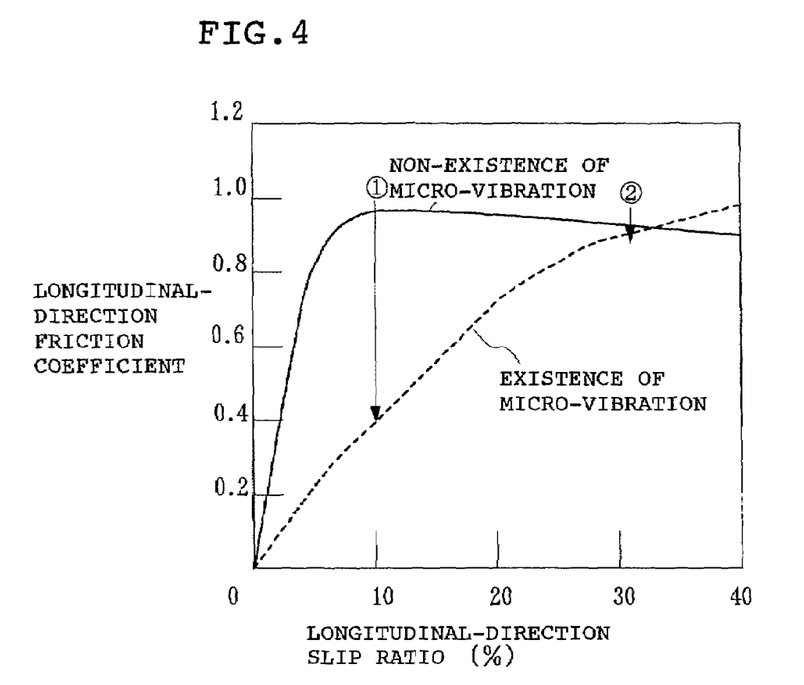
FIG. 4 is diagram showing the measurement results of dependence on longitudinal-direction slip ratio of the longitudinal-direction friction coefficient of each tire according to the preferred embodiment of the present invention.

To verify the function of the present invention, a device for measuring a slip ratio-friction coefficient (sµ curve) was improved to apply micro-dynamic vibration in the revolution direction of the tire so as to measure a slip ratio-longitudinal-direction friction coefficient (sµ curve). The results are shown in FIG. 4.

In the measurement of the above sµ curve, the frequency of micro-vibration was set to 20 Hz and the amplitude of vibration deformation around the tire was set to 9 mm at a revolution speed V of 50 km/h. The longitudinal-direction friction coefficient greatly decreases (maximum of 100%) by the above micro-vibration in a low slip ratio range and slightly increases (several %) in a high slip ratio range. The shape of this cure changes by the amount of dynamic displacement, frequency and phase of micro-vibration. It can be understood from this that the slip ratio-friction coefficient curve can be freely changed by applying micro-vibration in the revolution direction of the tire.

Meanwhile, micro-dynamic vibration is applied in the revolution direction of the tire which is given a slip angle of 10° in the transverse direction of the tire to measure the slip ratio-transverse direction friction coefficient (sµ curve). The results are shown in FIG. 5.

The friction coefficient in the transverse direction sharply decreases when the longitudinal-direction slip ratio is increased by applying braking force but a reduction in the friction coefficient recovers when micro-dynamic vibration is applied. This can be accounted for the relationship of the friction circle of the tire that tire friction force in the longitudinal direction has a trade-off relationship with tire friction force in the transverse direction. That is, as the size of combined force (total of vectors) of longitudinal-direction force and transverse-direction force of the tire in contact with the ground does not exceed the size of friction force applied to the tire, when longitudinal-direction force is applied to the tire, generated transverse-direction force diminishes.

In FIG. 4, it has been confirmed that longitudinal-direction force tends to be diminished and transverse-direction force tends to be recovered by applying micro-dynamic vibration in the revolution direction of the tire in the low slip ratio range shown by (1). In the low slip ratio range shown by (1), longitudinal-direction force and transverse-direction force are not changed much by applying micro-dynamic vibration.

Figure 5:
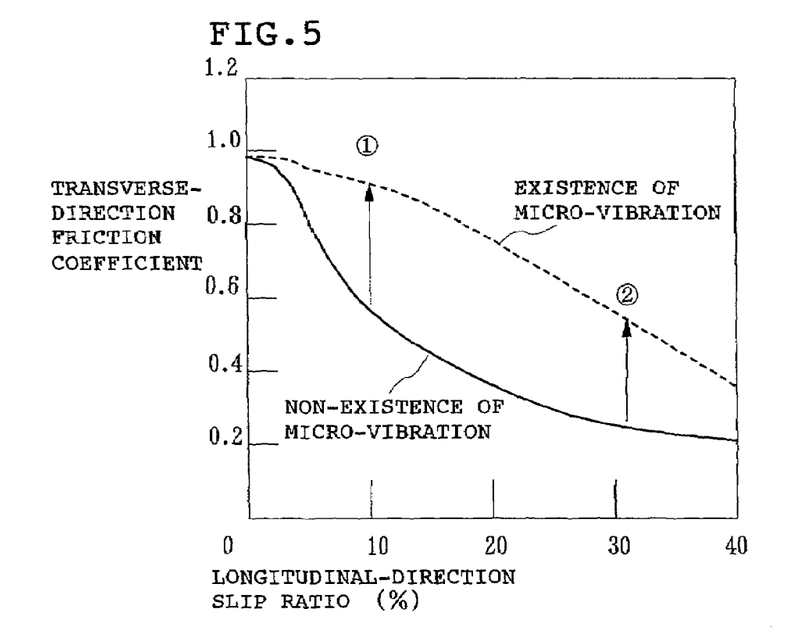
FIG. 5 is a diagram showing the measurement results of dependence on longitudinal-direction slip ratio of the transverse-direction friction coefficient of each tire according to the preferred embodiment of the present invention.

Further, when vibration is applied in the width direction of the tire, as shown in FIG. 5, longitudinal-direction force tends to be recovered if transverse-direction force diminishes, contrary to the case where vibration is applied in the revolution direction of the tire.

Meanwhile, since the tire friction curve is changed as in FIG. 4 and FIG. 5 when the tire receives longitudinal-direction, transverse-direction or vertical-direction vibration as disturbance, additional micro-vibration is generated to interfere with this disturbance vibration, preferably, the amplitude, frequency and phase of the above additional micro-vibration are determined by model follow-up control and feedback in order to cancel the above disturbance vibration (become the opposite phase) so that the above friction curve can be restored to a tire friction curve with little vibration (preferably no vibration).

Vibration is applied only in the revolution direction of the tire in the above example but vibration may be applied in both the revolution direction and the width direction of the tire, thereby making it possible to improve friction coefficients in both longitudinal and transverse directions and to control the motion behavior of the vehicle.

For example, vibration in the revolution direction of the tire is applied or increased to improve a friction coefficient in the transverse direction and vibration is applied or increased in the width direction of the tire to improve a friction coefficient in the longitudinal direction. Therefore, though the slip ratio-friction coefficient curve of the tire depends on the structure and material of the tire in the prior art, micro-vibration is applied to the tire to freely change the slip ratio-friction coefficient curve, thereby greatly increasing the freedom of control of vehicle movement.

EXAMPLES

Figure 6:
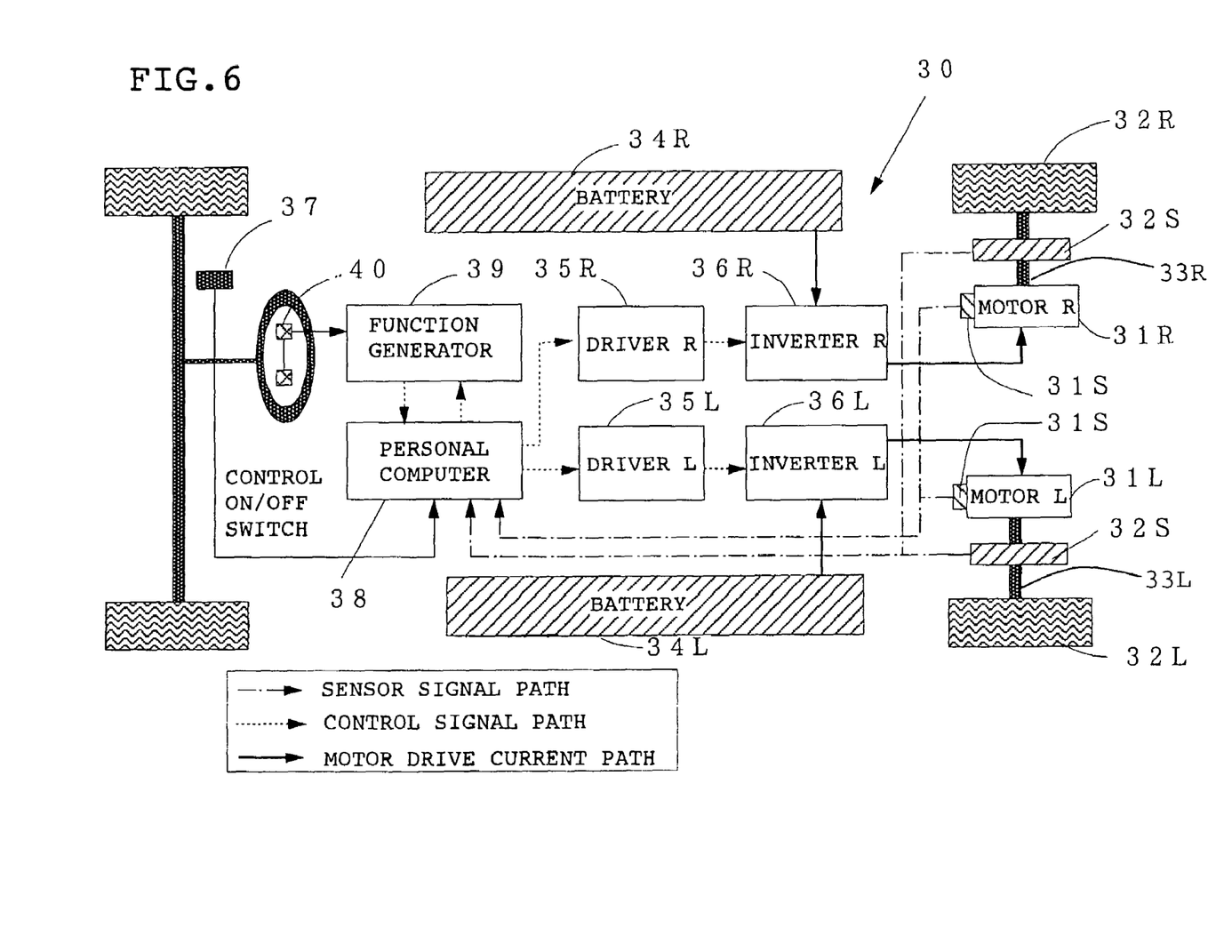
FIG. 6 is a diagram showing the outline of an experimental vehicle according to the present invention.

To verify the effect of the present invention, a running test was conducted using an electric vehicle which controls two wheels independently of the other two as an experimental vehicle. FIG. 6 is a block diagram showing the constitution of this experimental vehicle 30, and two AC motors 31L and 31R were mounted as drive power sources to transmit power to right and left rear tires 32L and 32R through shafts 33L and 33R, respectively. Batteries (lead storage batteries) 34L and 34R were applied as power sources and the voltages of the batteries 34L and 34R were controlled by drivers 35L and 35R and applied to the above AC motors 31L and 31R through inverters 36L and 36R, respectively.

In this example, the unstable states of the tires were detected by detection signals applied to a personal computer 38 from revolution sensors 31S and 31S attached to the shafts 33L and 33R and torque sensors 32S and 32S for detecting the torque's of the AC motors 31L and 31R, and a DC voltage signal corresponding to predetermined drive torque and a micro-vibration signal having a frequency higher than the response frequency of the vehicle and higher than the response frequency of each tire were applied to the AC motors 31L and 31R through the drivers 35L and 35R in response to an acceleration signal applied to the personal computer 38 from an accelerator 37, respectively. The application of the above micro-vibration was carried out by adding a vibration waveform generated by a function generator 39 to the above DC voltage signal by means of unshown micro-vibration adding means in the above personal computer 38. The micro-vibration may be applied by means of the function generator 39 by operating a vibration generation switch 40 installed next to the driver's seat, or by waveform generation program incorporated in the personal computer.

As a control system, voltage amplitude control such that a micro-voltage vibration corresponding to feedback torque is added to an acceleration signal operated by the driver, was carried out using the above model follow-up control program. The frequency was modulated to a range of 20 to 100 Hz to match the speed of the vehicle.

As for the contents of the test, an acceleration test on running straight and an acceleration test on turning were conducted.

(1) The driver first ran straight on a dry asphalt road ($\mu=0.9$) at V=50 kg/h and then stepped on the accelerator to the full to rapidly increase the speed as soon as he entered a wet asphalt road ($\mu=0.4$). In this test, the behavior of the vehicle was observed when micro-vibration control was conducted and when not conducted.

(2) The driver operates the steering wheel to turn on a wet asphalt road ($\mu=0.4$) at V=50 km/h so that the actual steering angle of the front wheels became 3 degrees and then stepped on the accelerator about 3 seconds after the start of turning to rapidly increase the speed. In this test, the behavior of the vehicle was observed when micro-vibration control was conducted and when not conducted.

The results of the above two tests are shown in Table 1 below.

TABLE 1

| | NON-EXISTENCE OF MICRO-VIBRATION | EXISTENCE OF MICRO-VIBRATION |
|---|---|---|
| ① ACCELERATION TEST ON RUNNING STRAIGHT | REAR WHEELS SLIGHTLY SLIP | STABLE ACCELERATION |
| ② ACCELERATION TEST ON TURNING | REAR WHEELS SLIP | STABLE ACCELERATION |

It has been thereby confirmed from the acceleration tests on running straight and on turning that when micro-vibration control is carried out, the behavior of the vehicle is more stable than when micro-vibration control is not carried out. It has also been confirmed from the constant-speed turning test that the turning speed is 10% higher when micro-vibration control is carried out than when micro-vibration is not carried out.

In the preferred embodiment of the present invention, micro-vibration is applied in the revolution direction of the tire by superposing a micro-vibration signal to a drive signal for the electric motor. The micro-vibration to be applied to the tire may be applied not only in the revolution direction of the tire but also the steering angle direction of the tire and the load support direction of the tire. To apply micro-vibration in the steering angle direction of the tire, a micro-vibration signal is superposed on a steering torque signal for the electric motor for aiding the steering force of the steering shaft. Even when the vehicle is running straight on a low-μ road, micro-vibration may be applied to each tire.

Alternatively, micro-vibration may be applied in the revolution direction, steering angle direction or load support direction of the tire by providing an actuator connected to the tire.

Figure 7:
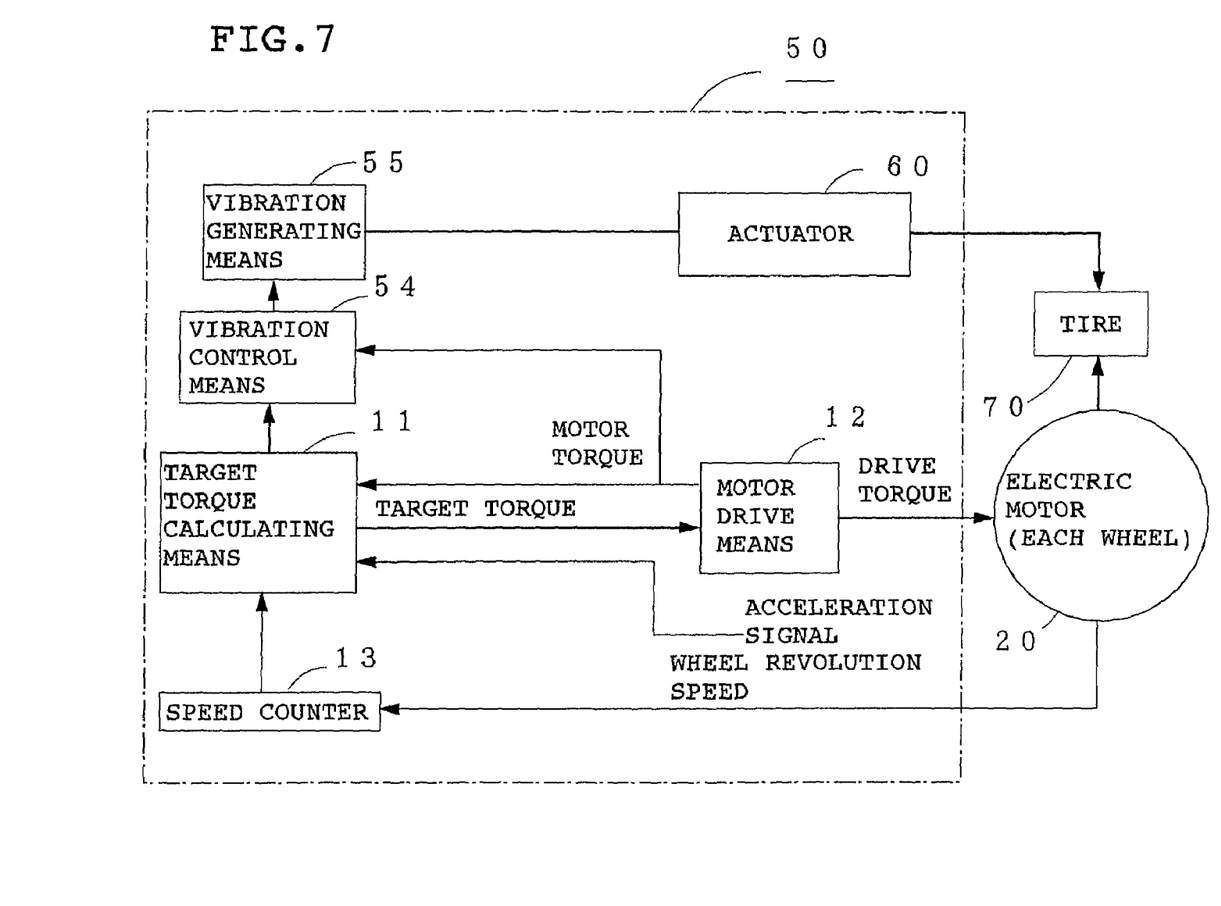
FIG. 7 is a diagram showing the constitution of another vehicle control apparatus according to the present invention.

FIG. 7 is a diagram showing the constitution of a vehicle control apparatus 50 for applying micro-vibration to the tire using the actuator 60. Vibration generation means 55 generates a micro-vibration signal based on a control signal from vibration control means 54 and applies the signal to the actuator 60 to apply micro-vibration to each tire 70 independently of driving of the wheels.

Alternatively, micro-vibration may be applied in the revolution direction, steering angle direction or load support direction of the tire by using an apparatus comprising a counter weight attached to a rotor rotating on the center of an axis such as an actuator or motor, or an eccentric rotor.

That is, by providing means of generating vibration in the force direction of the tire to be controlled, the deformation of the tire in that direction can be controlled with the result that force generated by the tire (friction force of the tire with the road surface) can be freely controlled.

The present invention can be applied not only to cars which are driven by electric motors but also to cars which are driven by the combustion of fossil fuel and cars which are driven by both electricity and fossil fuel.

As described above, problems which are encountered when micro-dynamic vibration is applied are the deformation characteristics and response characteristics of the tire, conditions for applying micro-dynamic vibration are optimized for the deformation characteristics and responsibilities of the vehicle and tire, and the accuracy and fineness of control of these properties are attained by matching the structure of the tire.

Therefore, when this technique is used for the control of the motion behavior of the vehicle, conditions for applying micro-dynamic vibration are controlled to stabilize the tire by light feedback control via sensors around the tires so that the motion behavior of the vehicle is optimized by strong feedback control via sensors attached to the vehicle, or when an operation system which enables the driver to optionally apply micro-dynamic vibration other than regular steering, acceleration, brake and clutch operations is provided, the slip ratio of the tire can be freely controlled by the driver s optional operation besides the regular steering, acceleration, brake and clutch operations, thereby making it possible to enable the driver to enjoy the pleasure and freedom of driving.

Rolling resistance caused by friction between the road surface and the tire can be reduced by applying micro-vibration in the load support direction of the tire or the revolution direction of the tire. In this case, the power source of energy to be consumed by micro-vibration is preferably an energy power source other than a drive power source.

As having been described above, according to the present invention, since friction force between the tire and the road surface is controlled by changing the slip ratio-friction characteristics themselves of the tire by applying micro-vibration to the tire, the running performance of the vehicle can be improved and the safety of the vehicle can be greatly enhanced.

What is claimed is:

1. A vehicle control method, comprising:
applying a vibration to a tire in a running state to reduce a coefficient of friction in a longitudinal direction of the tire, between the tire and the surface of a road, and so as to increase a coefficient of friction in a width direction of the tire between the tire and the road, wherein the vibration is applied in a revolution direction of the tire,
thereby controlling the running state of the vehicle,
wherein the vibration is a micro-vibration having a frequency falling within the range of 20 Hz-1 kHz.

2. The vehicle control method according to claim 1, wherein in addition in the revolution direction of the tire, the vibration is also applied in a load support direction of the tire.

3. The vehicle control method according to claim 2, wherein at least one of an amplitude, a frequency and a phase of the vibration to be applied to the tire in the revolution direction of the tire, is controlled to minimize a rolling resistance of the tire caused by friction between the tire and the surface of a mad at the time of running.

4. The vehicle control method according to claim 2, wherein at least one of an amplitude, a frequency and a phase of the vibration to be applied to the tire in the load support direction of the tire, is controlled to minimize a rolling resistance of the tire caused by friction between the tire and the surface of a road at the time of running.

5. The vehicle control method according to claim 1, wherein an amplitude of the vibration is modulated to a range of 1 to 2,000% of the depth of a tread of the tire or the thickness of a top tread of rubber of the tire.

6. The vehicle control method according to claim 5, wherein at least one of the amplitude, a frequency and a phase of the vibration to be applied to the tire in the revolution direction of the tire, is controlled to minimize a rolling resistance of the tire caused by friction between the tire and the surface of a road at the time of running.

7. The vehicle control method according to claim 5, further comprising applying another vibration in a load support direction, wherein at least one of the amplitude, a frequency and a phase of said another vibration to be applied to the tire in the load support direction of the tire, is controlled to minimize a rolling resistance of the tire caused by friction between the tire and the surface of a road at the time of running.

8. The vehicle control method according to claim 1, wherein a frequency of the vibration is modulated to a range of 20 Hz to 1 kHz.

9. The vehicle control method according to claim 8, wherein at least one of an amplitude, the frequency and a phase of the vibration to be applied to the tire in the revolution direction of the tire, is controlled to minimize a rolling resistance of the tire caused by friction between the tire and the surface of a road at the time of running.

10. The vehicle control method according to claim 8, further comprising applying a further vibration in a load support direction, wherein at least one of an amplitude, the frequency and a phase of the further vibration to be applied to the tire in the load support direction of the tire, is controlled to minimize a rolling resistance of the tire caused by friction between the tire and the surface of a road at the time of running.

11. The vehicle control method according to claim 1, wherein at least one of an amplitude, a frequency and a phase of the vibration to be applied to the tire in the revolution direction of the tire, is controlled to minimize a rolling resistance of the tire caused by friction between the tire and the surface of a road at the time of running.

12. The vehicle control method according to claim 1, wherein the vibration is also applied in the width direction of the tire.

13. The vehicle control method according to claim 12, wherein at least one of an amplitude, a frequency and a phase of the vibration to be applied to the tire in the revolution direction of the tire, is controlled to minimize a rolling resistance of the tire caused by friction between the tire and the surface of a road at the time of running.

14. The vehicle control method according to claim 12, wherein at least one of an amplitude, a frequency and a phase of the vibration to be applied to the tire in the load support direction of the tire, is controlled to minimize a rolling resistance of the tire caused by friction between the tire and the surface of a road at the time of running.

* * * * *